United States Patent
Behravan et al.

(10) Patent No.: US 10,645,661 B2
(45) Date of Patent: May 5, 2020

(54) CONFIGURING DISCOVERY SIGNALS

(71) Applicant: Telefonaktiebolaget L M Ericsson (publ), Stockholm (SE)

(72) Inventors: Ali Behravan, Stockholm (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1013 days.

(21) Appl. No.: 14/825,646

(22) Filed: Aug. 13, 2015

(65) Prior Publication Data

US 2016/0050637 A1 Feb. 18, 2016

Related U.S. Application Data

(60) Provisional application No. 62/037,716, filed on Aug. 15, 2014.

(51) Int. Cl.
*H04W 56/00* (2009.01)
*H04L 5/00* (2006.01)
*H04W 48/16* (2009.01)

(52) U.S. Cl.
CPC ......... *H04W 56/001* (2013.01); *H04L 5/0048* (2013.01); *H04W 48/16* (2013.01); *H04W 56/00* (2013.01)

(58) Field of Classification Search
None
See application file for complete search history.

(56) References Cited

U.S. PATENT DOCUMENTS

| | | | |
|---|---|---|---|
| 2009/0016320 A1* | 1/2009 | Li | H04W 56/0015 370/350 |
| 2009/0052561 A1* | 2/2009 | Baxley | H04B 1/59 375/260 |
| 2009/0232113 A1* | 9/2009 | Tamaki | H04W 56/003 370/337 |
| 2010/0035641 A1* | 2/2010 | Kobayashi | H04W 56/0015 455/502 |

(Continued)

FOREIGN PATENT DOCUMENTS

| CN | 102595450 A | 7/2012 |
|---|---|---|
| TW | 201112824 A | 4/2011 |

OTHER PUBLICATIONS

Ericsson: "RRM Procedures with DRS," 3GPP Draft; R1-143319, 3rd Generation Partnership Project; Dresden, Germany, Aug. 10, 2014.

(Continued)

*Primary Examiner* — Alpus Hsu
*Assistant Examiner* — Camquyen Thai
(74) *Attorney, Agent, or Firm* — Withrow & Terranova, PLLC

(57) ABSTRACT

A method in a first network node is disclosed. The method comprises determining a time synchronization level for at least a pair of network nodes, the time synchronization level comprising information about a difference in start time of the radio frames in a downlink or radio subframes in a downlink between the at least a pair of network nodes. The method further comprises adapting one or more discovery reference signal parameters based at least in part on the determined time synchronization level for the at least a pair of network nodes, and transmitting a discovery reference signal using the adapted one or more discovery reference signal parameters.

18 Claims, 8 Drawing Sheets

(56) References Cited

U.S. PATENT DOCUMENTS

| | | | |
|---|---|---|---|
| 2010/0054206 A1* | 3/2010 | Kalhan | H04W 48/08 370/331 |
| 2010/0157906 A1* | 6/2010 | Yang | H04W 56/001 370/328 |
| 2010/0208720 A1* | 8/2010 | Fujishima | H04W 56/0015 370/350 |
| 2011/0158164 A1* | 6/2011 | Palanki | H04W 56/0015 370/328 |
| 2012/0120821 A1 | 5/2012 | Kazmi et al. | |
| 2012/0307670 A1 | 12/2012 | Kazmi et al. | |
| 2013/0003560 A1* | 1/2013 | Lundevall | H04W 24/00 370/241 |
| 2014/0038598 A1* | 2/2014 | Ren | H04W 48/16 455/434 |
| 2014/0171073 A1* | 6/2014 | Kim | H04W 48/16 455/434 |
| 2014/0242963 A1* | 8/2014 | Novlan | H04W 48/16 455/418 |
| 2015/0006633 A1* | 1/2015 | Vandwalle | H04L 67/1051 709/204 |
| 2015/0029893 A1* | 1/2015 | Gulati | H04W 72/0446 370/254 |
| 2015/0049649 A1* | 2/2015 | Zhu | H04W 52/325 370/277 |
| 2015/0092582 A1* | 4/2015 | Liao | H04J 11/005 370/252 |
| 2015/0146620 A1* | 5/2015 | Phan | H04W 76/14 370/328 |
| 2015/0223147 A1* | 8/2015 | Fujishiro | H04W 8/005 370/329 |
| 2015/0271810 A1* | 9/2015 | Sartori | H04L 5/14 370/280 |
| 2016/0149681 A1* | 5/2016 | Vajapeyam | H04L 5/0048 370/252 |

OTHER PUBLICATIONS

Huawei, et al.: "Mechanisms for energy-efficient small cell discovery and measurements," 3GPP Draft; R1-141589, 3rd Generation Partnership Project; Shenzhen, China; Mar. 22, 2014.

NTT DOCOMO: "Small Cell Discovery for Efficient Small Cell On/Off Operation;" 3GPP Draft; R1-133457; Barcelona, Spain; Aug. 10, 2013.

Ericsson: "Remaining Details on Discovery Signal Design;" 3GPP Draft; R1-143317; 3rd Generation Partnership Project; Dresden, Germany; Aug. 10, 2014.

Huawei: "Small cell enhancements—physical layer aspects;" 3GPP Draft; RP-132073; 3rd Generation Partnership Project; Dec. 3-6, 2013.

International Search Report and Written Opinion for International Patent Application No. PCT/IB2015/056179, dated Jan. 21, 2016, 14 pages.

International Preliminary Report on Patentability for International Patent Application No. PCT/IB2015/056179, dated Mar. 2, 2017, 11 pages.

* cited by examiner

CONFIGURING DISCOVERY SIGNALS

PRIORITY

This application claims the benefit under 35 U.S.C. § 119(e) of the priority of U.S. Provisional Application 62/037,716 filed on Aug. 15, 2014, entitled "Configuring Discovery Signals," the entire disclosure of which is hereby incorporated by reference.

TECHNICAL FIELD

The present disclosure relates, in general, to wireless communications and, more particularly, to configuring discovery signals.

BACKGROUND

In densely deployed small cells, low interference between cells facilitates efficient operation. One mechanism that has been introduced to provide low interference between cells is small cell on/off, which can also provide energy savings. In small cell on/off, the small cell may be turned on and off where the "on" and "off" period may depend on various criteria and/or the application.

There are two kinds of small cell on/off: semi-static small cell on/off and dynamic small cell on/off. In semi-static small cell on/off, the criteria for cell on/off can be traffic load, UE arrival/departure, etc. In dynamic small cell on/off, the small cell can be turned on and off on the radio frame or subframe level. The criteria for dynamic small cell on/off can be packet arrival/completion or interference coordination and avoidance (i.e., reduce interference towards other nodes or user equipment (UEs)). Thus, the cell turns off at the subframe boundary (or end of the current subframe) when the transmission of a packet is completed, and turns on at the next subframe boundary where a packet arrives. Another purpose of small cell on/off can be for energy saving.

There are different operational modes of small cell on/off. A first example is handover or cell change mode. In this mode, a UE in CONNECTED mode is always attached to a cell. The network may decide to offload the UE by handover to a small cell due to, for example, increased traffic demand. The small cell that can be "off" wakes up to serve the UE. The handover time in this case depends on the backhaul delay and the handover execution time. After completion of the transmission and/or reception of data, the UE goes to IDLE mode or is handed over to another cell. The small cell can then be turned off Another example of cell change is RRC connection release with re-direction.

A second example operating mode is SCell only mode. In SCell only mode, a carrier aggregation (CA) capable UE is connected to a Primary Cell (PCell), and the network configures a secondary cell (SCell) that can be turned on or off. If the network decides to offload the UE traffic to SCell, then the SCell is turned on. A third example is dual connectivity mode. In this mode, the UE is connected to two network nodes. One of the nodes to which the UE is connected can be turned on and off. A fourth example is serving cell mode. In serving cell mode, a cell can be either on or off when a UE is connected to it. Certain procedures for radio resource management (RRM), radio link monitoring (RLM), and channel state information (CSI) measurements must be designed for this case.

In small cell on/off, the eNB can be off for long periods of time. To assist the UE with measurements, a discovery signal can be used. The discovery signal should support properties for enabling RRM measurements, RLM related procedures, and coarse time/frequency synchronization. In order to make the measurements possible, the eNB has to wake up periodically (e.g., once every 40 ms, 80 ms, or 160 ms, etc.) and send the discovery signal so that it can be used by the UE for mobility related operations such as cell identification, RLM, and measurement. So that the UE can perform measurements for RRM, a discovery reference signal (DRS) is provided by the network with a configurable structure. The UE performs measurements both on the serving cell as well as neighboring cells within the configured time intervals of the discovery burst.

Since the discovery signal is rather sparse in time, it is desirable that the UE be able to make a meaningful measurement in one instance of the discovery signal rather than having to wait for multiple instances, which may occur tens or hundreds of milliseconds apart. In addition, in order to make the measurement based on fewer samples in time more reliable, the discovery signal may need to be sent on wide bandwidth (e.g., the whole bandwidth).

It has been agreed in 3GPP that a UE assumes primary synchronization signals, secondary synchronization signals, and common reference signals (PSS/SSS/CRS) in the DRS. Additionally, CSI-RS is assumed in the DRS for measurement if configured by higher layers. Both CRS-based reference signal received power (RSRP) measurements and CSI-RS-based RSRP measurements are supported. The UE may report DRS-based RSRP and reference signal received quality (RSRQ), as well as associated physical cell ID (PCID) and information for TP identification.

For DRS-based measurement, a UE assumes that a DRS occasion for a cell consists of one instance of PSS/SSS according to Rel-8. The UE also assumes that CRS is transmitted at least in the same subframe(s) as PSS/SSS, and that a DRS occasion can include multiple CSI-RS RE configurations. The different CSI-RS configurations may be in the same or different subframe(s). A DRS occasion for a cell includes N consecutive subframes (N<=5), and a DRS occasion for a cell is transmitted every M ms (candidate values for M so far are 40, 80, 160).

Several radio-related measurements may be used by the UE or the network node to establish and keep the connection, as well as ensuring the quality of a radio link. The measurements are used in radio resource control (RRC) idle state operations such as cell selection, cell reselection (e.g., between E-UTRANs, between different radio access technologies (RATs), and to non-3GPP RATs), minimization of drive test (MDT), and also in RRC connected state operations such as cell change (e.g., handover between E-UTRANs, handover between different RATs, and handover to non-3GPP RATs). The UE has to first detect a cell, and therefore cell identification (e.g., acquisition of a physical cell identity (PCI)), is also a signal measurement. The UE may also have to acquire the cell global ID (CGI) of a UE. The RSRP and RSRQ are used for at least RRM, such as for mobility, which includes mobility in RRC connected state as well as in RRC idle state. The RSRP and RSRQ are also used for other purposes such as for enhanced cell ID positioning, minimization of drive test etc.

In RRC connected state, the UE can perform intrafrequency measurements without measurement gaps. As a general rule, however, the UE performs inter-frequency and inter-RAT measurements in measurement gaps unless it is capable of performing them without gaps. To enable inter-frequency and inter-RAT measurements for the UE requiring gaps, the network has to configure the measurement gaps.

Two periodic measurement gap patterns—both with a measurement gap length of 6 ms—are defined for LTE: measurement gap pattern #0 with repetition period 40 ms; and measurement gap pattern #1 with repetition period 80 ms. The measurements performed by the UE are then reported to the network, which may use them for various tasks.

The radio network node (e.g., base station) may also perform signal measurements. Examples of radio network node measurements in LTE are propagation delay between UE and itself, UL SINR, UL SNR, UL signal strength, Received Interference Power (RIP), etc. The eNB may also perform positioning measurements.

The UE also performs measurements on the serving cell (also referred to as primary cell) in order to monitor the serving cell performance. This is known as radio link monitoring (RLM) or RLM related measurements in LTE. For RLM, the UE monitors the downlink link quality based on the cell-specific reference signal in order to detect the downlink radio link quality of the serving or PCell. The UE detects out of sync and in sync by comparing the estimated quality with the thresholds Qout and Qin respectively. The threshold Qout and Qin are defined as the level at which the downlink radio link cannot be reliably received, and corresponds to 10% and 2% block error rate of a hypothetical PDCCH transmissions, respectively. The overall serving cell or neighbour cell measurement quantity results include non-coherent averaging of two or more basic non-coherent averaged samples.

FIG. 1 is a schematic diagram of an example averaging of RSRP measurements in E-UTRAN. More particularly, FIG. 1 illustrates an example in which the UE obtains the overall measurement quantity result by collecting four non-coherent averaged samples or snapshots 5A-5D (each of 3 ms length in this example) during the physical layer measurement period (i.e., 200 ms) when no discontinuous reception (DRX) is used or when the DRX cycle is not larger than 40 ms. Every coherent averaged sample is 1 ms long. The sampling also depends upon the length of the DRX cycle. For example, for DRX cycle greater than 40 ms, the UE typically takes one sample every DRX cycle over the measurement period. A similar measurement sampling mechanism is used for other signal measurements by the UE and also by the BS for UL measurements. Although FIG. 1 illustrates a particular example averaging of RSRP measurements, the exact sampling may vary according to particular implementations.

SUMMARY

To address the foregoing problems with existing solutions, disclosed is a method in a first network node. The method comprises determining a time synchronization level for at least a pair of network nodes, the time synchronization level comprising information about a difference in start time of the radio frames in a downlink or radio subframes in a downlink between the at least a pair of network nodes. The method further comprises adapting one or more discovery reference signal parameters based at least in part on the determined time synchronization level for the at least a pair of network nodes, and transmitting a discovery reference signal using the adapted one or more discovery reference signal parameters.

In certain embodiments, the method may further comprise communicating information about the adapted discovery reference signal parameters to another node. The method may further comprise receiving, from one or more wireless devices, an indication that the first network node should adapt one or more discovery reference signal parameters. Adapting one or more discovery reference signal parameters may be further based at least in part on the indication received from the one or more wireless devices indicating that the first network node should adapt one or more discovery reference signal parameters.

In certain embodiments, determining the time synchronization level for the at least a pair of network nodes may comprise one or more of: determining the time synchronization level for the at least a pair of network nodes based at least in part on pre-defined information; receiving information about the time synchronization level for the at least a pair of network nodes; and determining the time synchronization level for the at least a pair of network nodes based at least in part on one or more of historical data or a previously assumed synchronization level. The one or more discovery reference signal parameters may comprise one or more of: a discovery reference signal periodicity; a discovery reference signal bandwidth; and a duration of the discovery reference signal burst. The at least a pair of network nodes may comprise one of: the first network node and a neighboring network node; the first network node and one or more neighboring network nodes within a threshold range of the first network node; and a second network node and a third network node. Adapting the one or more discovery reference signal parameters may be further based at least in part on whether the determined time synchronization level is larger than a threshold time.

Also disclosed is a first network node. The first network node comprises one or more processors. The one or more processors are configured to determine a time synchronization level for at least a pair of network nodes, the time synchronization level comprising information about a difference in start time of the radio frames in a downlink or radio subframes in a downlink between the at least a pair of network nodes. The one or more processors are configured to adapt one or more discovery reference signal parameters based at least in part on the determined time synchronization level for the at least a pair of network nodes, and transmit a discovery reference signal using the adapted one or more discovery reference signal parameters.

Also disclosed is a method in a wireless device. The method comprises determining whether to communicate an indication to a first network node indicating that the first network node should adapt one or more discovery reference signal parameters. The method further comprises communicating the indication to the first network node indicating that the first network node should adapt one or more discovery reference signal parameters.

In certain embodiments, the method may further comprise determining a time synchronization level between one or more cells. Determining whether to communicate an indication to a first network node indicating that the first network node should adapt one or more discovery reference signal parameters may be based at least in part on one or more of: the determined time synchronization level between the one or more cells; and one or more radio measurements performed by the wireless device on one or more cells with discovery reference signal transmission on the carrier. Communicating the indication to the first network node indicating that the first network node should adapt one or more discovery reference signal parameters may comprise one or more of: sending a request that one or more discovery reference signal parameters be adapted, and indicating that the one or more discovery reference signal parameters should be adapted to one of a denser level or a coarser level with respect to one or more reference values.

In certain embodiments, the one or more discovery reference signal parameters may comprise one or more of: a discovery reference signal periodicity; a discovery reference signal bandwidth; and a duration of the discovery reference signal burst. The method may further comprise receiving information about the adapted discovery reference signal parameters from the first network node. The method may further comprise using the received information about the adapted discovery reference signal parameters to perform one or more radio operations. The one or more radio operations may comprise one or more of adapting one or more parameters used for radio measurements on discovery reference signals, and determining a synchronization level used in the network.

Also disclosed is a wireless device. The wireless device comprises one or more processors configured to determine whether to communicate an indication to a first network node indicating that the first network node should adapt one or more discovery reference signal parameters. The one or more processors are configured to communicate the indication to the first network node indicating that the first network node should adapt one or more discovery reference signal parameters.

Certain embodiments of the present disclosure may provide one or more technical advantages. For example, certain embodiments may allow discovery reference signal parameters to be configured according to the actual need in the network (i.e., depending on synchronization level). As another example, certain embodiments may enable the network to determine optimal values of discovery reference signal parameters. As another example, certain embodiments may prevent wasting of discovery reference signal subframes in a discovery reference signal burst if the cells in the network are not synchronized. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, a UE may perform one or more measurements using the DRS from network nodes using small cell on/off. A UE performing measurements on its serving cell and neighboring cells uses the timing of the serving cell for measurements on the other cells. Often, however, cells within a network are not perfectly synchronized. As a result, the DRS occasions may not be perfectly aligned, and the UE may miss part of the DRS burst from the other cells. The timing misalignment for DRS between the cells may increase complexity and power consumption in the UE. The present disclosure contemplates various embodiments that may reduce or eliminate the problems associated with timing misalignment for DRS.

For example, in certain embodiments a first network node may determine a time synchronization level for at least a pair of network nodes, and adapt one or more DRS related parameters (e.g., DRS burst duration) based at least in part on the determined time synchronization level. The first network node may transmit the DRS using the adapted one or more DRS parameters. In some cases, the first network node may communicate information about the adapted DRS parameters to another node (e.g., another network node and/or UE). In certain embodiments, a UE may determine, based on one or more criteria (e.g., synchronization level, measurement performance, or any other suitable criteria) whether one or more parameters related to the DRS should be adapted. The UE may send an indication to the network node recommending the network node adapt one or more parameters related to the DRS (e.g., by sending a request that one or more DRS parameters need to be adapted on a certain carrier frequency or by indicating whether the DRS parameters should be adapted to a denser level or a coarser level with respect to the current values or with respect to reference values). The various embodiments described herein may advantageously allow DRS parameters to be configured according to the actual need in the network (i.e., depending on synchronization level), and enable the network to determine optimal values of parameters for DRS.

Figure 1:
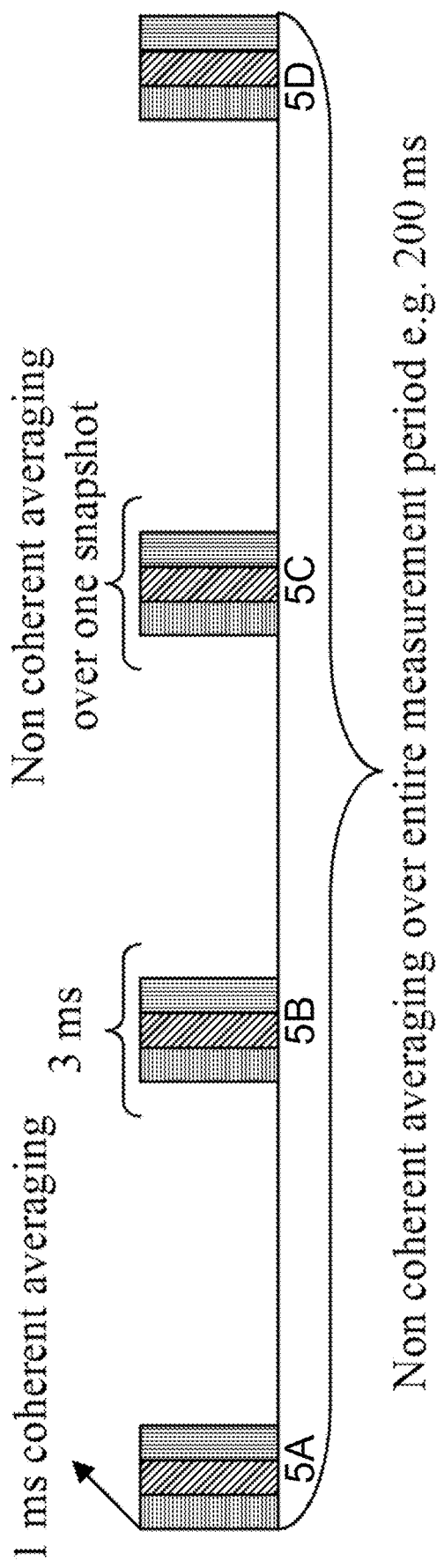
FIG. 1 is a schematic diagram of an example of RSRP measurement averaging in E-UTRAN.
Figure 2:
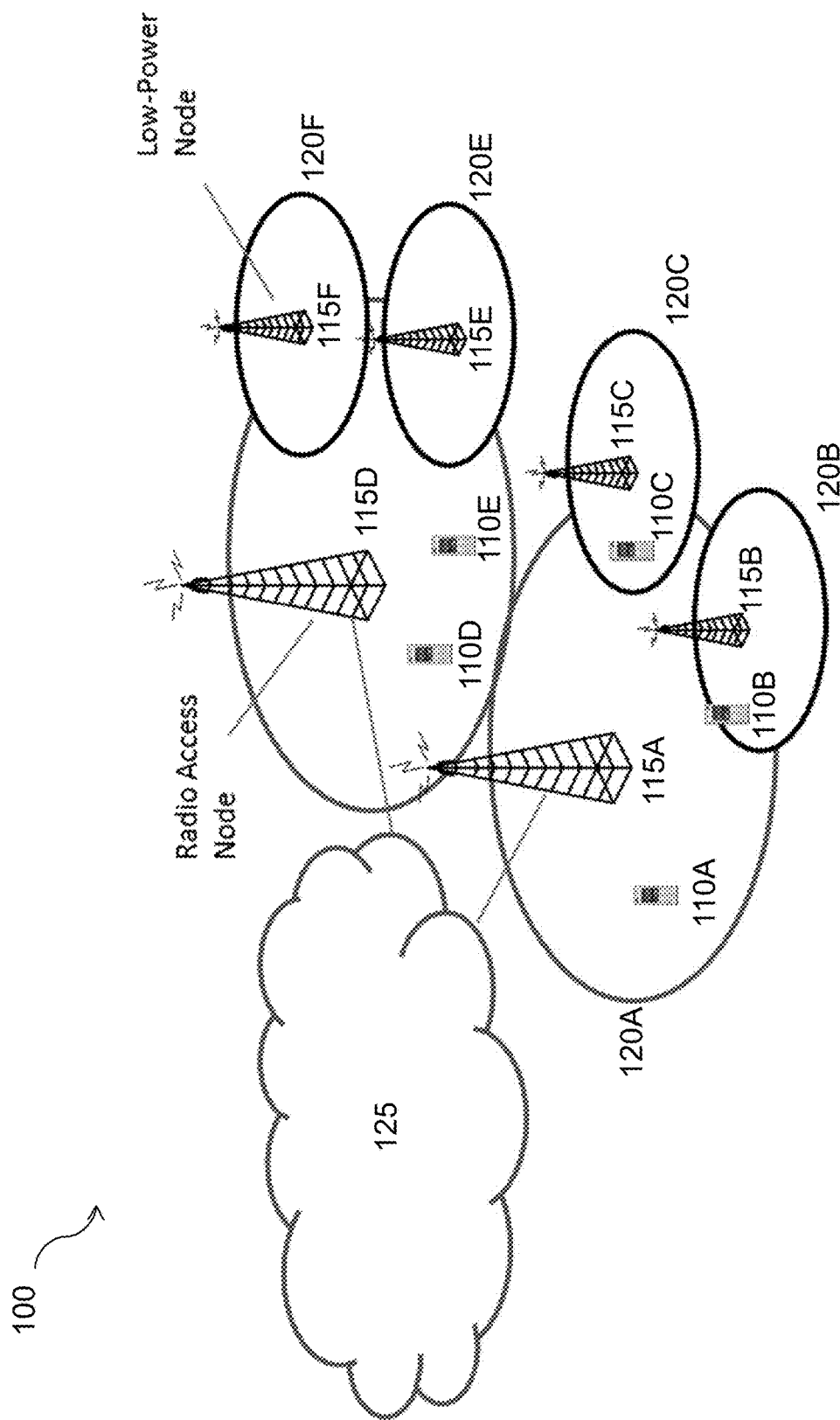
FIG. 2 illustrates an example wireless communications network, in accordance with certain embodiments.

FIG. 2 illustrates an example wireless communications network 100, in accordance with certain embodiments. Network 100 includes one or more wireless device(s) 110 (which may be interchangeably referred to as UEs 110) and network node(s) 115 (which may be interchangeably referred to as eNBs 115). Network 100 may be any suitable type of network, such as a heterogeneous LTE network. Network node 100 may include any suitable combination of network nodes 115 and wireless devices 110. For example, network 100 may include network nodes 115A-F and wireless devices 110A-E. Network nodes 115A-F may be any suitable combination of types of network nodes (e.g., macro and/or low-power nodes). For example, network nodes 115A and 115D may be macro nodes, and network nodes 115B, 115C, 115E, and 115F may be low power nodes.

A wireless device 110 may communicate with a network node 115 over a wireless interface. For example, wireless device 110 may transmit wireless signals to network node 115 and/or receive wireless signals from network node 115. The wireless signals may contain voice traffic, data traffic, control signals, and/or any other suitable information. In some embodiments, an area of wireless signal coverage associated with a network node 115 may be referred to as a cell. For example, each of network nodes 115A-D may have an associated area of wireless signal coverage 120A-D, respectively. More particularly, cells 120A and 120D associated with network nodes 115A and 115D, respectively, may be macro cells. Cells 120B, 120C, 120E, and 120F associated with low-power network nodes 115B, 115C, 115E, and 115F, respectively, may be small cells. In some cases, the configuration illustrated in FIG. 2 can be extrapolated to include densely deployed small cells. One or more of network nodes 115 may be capable of small cell on/off. For example, low-power nodes 115B, 115C, 115E, 115F may be capable of small cell on/off.

Network node 115 may interface with a radio network controller. The radio network controller 120 may control network node 115 and may provide certain radio resource management functions, mobility management functions, and/or other suitable functions. The radio network controller may interface with a core network node. In certain embodiments, the radio network controller may interface with the core network node via an interconnecting network 125. Interconnecting network 125 may refer to any interconnecting system capable of transmitting audio, video, signals, data, messages, or any combination of the preceding.

In some embodiments, the core network node may manage the establishment of communication sessions and various other functionality for wireless device 110. Wireless device 110 may exchange certain signals with core network node 130 using the non-access stratum layer. In non-access stratum signaling, signals between wireless device 110 and the core network node may be transparently passed through the radio access network.

Although FIG. 2 illustrates a particular configuration of network 100, the present disclosure contemplates that network 100 may include any suitable number and combination of UEs 110 and network nodes 115. UEs 110 may represent communication devices that include any suitable combination of hardware and/or software. Network nodes 115 may be any suitable type of access nodes capable of communicating with UEs 110. Network 100 may also include any additional elements suitable to support communication between UEs 110 or between a UE 110 and another communication device. Network nodes 115 may include multiple categories of access nodes. For example, network 100 may include a first category of radio access nodes (such as eNodeBs or other macro base stations (BSs)) and a second category of radio access nodes (such as pico or femto base stations, or other micro base stations). As noted above, network nodes 115A and 115D in FIG. 2 may be macro nodes, and network nodes 115B, 115C, 115E, and 115F may be low-power nodes. The radio access nodes in the first category may differ from those in the second category in terms of their transmission power, their sensitivity, their maximum number of supported UEs, their service area, or any other aspect of their operation. These differences may be a result of permanent differences in the capabilities or components of the relevant nodes or may result from their configuration at a given time. In the latter case, different categories may include devices that may be identical in their components and capabilities, but simply configured differently at a particular instant. Example embodiments of wireless device 110, network node 115, and other network nodes (such as a radio network controller or core network node) are described with respect to FIGS. 6, 7, and 8, respectively.

Although terminology from 3GPP LTE has been used in this disclosure as an example, this should not be seen as limiting the scope of the disclosure to only the aforementioned system. Other wireless systems, including WCDMA, HSPPA, WiMax, WiFi, WLAN, and GSM/GERAN, may also benefit from exploiting the ideas covered within this disclosure. Similarly, terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, although certain embodiments may be described in terms of wireless transmissions in the downlink, the embodiments are equally applicable in the uplink.

A UE performing measurements on its serving cell and neighboring cells uses the timing of the serving cell for measurements on the other cells. For example, UE 110A may be served by network node 115A of cell 120A. UE 110A may perform measurements on network node 115A, as well as neighboring network node 115B of cell 120B. UE 110A may use the timing of network node 115A in performing these measurements. Often, however, cells within network 100 are not perfectly synchronized. As a result, the DRS occasions may not be perfectly aligned. As a result, UE 110A may miss part of the DRS burst from the other cells.

In certain embodiments, a first network node, such as network node 115A, determines a time synchronization level for at least a pair of network nodes. Network node 115A may adapt one or more parameters related to DRS transmission based on the determined time synchronization level between the at least a pair of network nodes 115. Network node 115A transmits the DRS using the adapted one or more DRS parameters. In some cases, network node 115A may communicate the information related to the adaptation to other nodes (e.g., UE 110A and/or one or more of network nodes 115B-F).

The time synchronization level between the at least a pair of network nodes may be defined in any suitable manner. For example, in certain embodiments the time synchronization level between two network nodes (e.g., network nodes 115A and 115B, which may be interchangeably referred to as cells 120A and 120B) may be the difference between the start time of their respective radio frames in the downlink. As another example, the time synchronization level between network nodes 115A and 115B may be the difference between the start time of their respective subframes in the downlink. The time synchronization level between network nodes 115A and 115B may be interchangeably referred to as simply synchronization or synchronization level, time offset, frame offset, subframe offset, time misalignment, time alignment error, etc.

Whether two network nodes 115 are considered to be synchronized or unsynchronized may vary depending on a particular implementation. For example, the time synchronization level between network nodes 115A and 115B may be 3 µs. In this case, network nodes 115A and 115B may be considered synchronized (or "synchronous") due to the short time difference. In another example, however, the time synchronization level between network nodes 115A and 115B may be 1 ms. In such a case, network nodes 115A and 115B may be considered unsynchronized (or "asynchronous") due to the larger time difference.

In order to adapt one or more DRS parameters, the network node determines the time synchronization level between the at least a pair of network nodes. For example, network node 115A may determine the time synchronization level between itself and a neighboring network node, such as network node 115B. In another example, network node 115A may determine the time synchronization level between itself and all or at least K geographically closest neighboring network nodes 115. In some cases, network node 115A may determine one time synchronization level value to be applicable for network 100 (e.g., the largest value between two network nodes 115 in network).

Network node 115A may determine the time synchronization level between the at least a pair of network nodes in any suitable manner. As one example, network node 115A may determine the time synchronization level between the at least a pair of network nodes based on pre-defined information (e.g., a stored lookup table which contains a mapping between time synchronization level and a pair of network nodes or cells). As another example, network node 115A may determine the time synchronization level using information received from another network node (e.g., from a neighboring network node such as network node 115B, from SON, O&M, OSS etc.). As yet another example, network node 115A may determine the time synchronization level using historical data or a synchronization level assumed in the past.

In some cases, network node 115A may obtain multiple values of time synchronization levels for different pairs of network nodes 115. In this case, the actual time synchronization level ($\Delta T$) to be considered by network node 115A for adapting the DRS parameters may be derived by network node 115A from a plurality of values based on one or more functions or rules. The plurality of values may typically belong to a pair of cells operating on the same carrier frequency. In some cases, however, the plurality of values may also belong to a pair of cells operating on different carrier frequencies. For example, the $\Delta T$ may be the maximum transmit time difference between the start of the radio frames of any pair of cells in the network. In certain embodiments, the function may be pre-defined or decided by network node 115A autonomously. An example of the function for deriving actual time synchronization level ($\Delta T$) based on N values of time synchronization levels between N pairs of network nodes 115 is expressed in Equation (1):

$$\Delta T = g(\delta t_{12}, \delta t_{13}, \delta t_{14}, \ldots \delta t_{1N}),\tag{1}$$

where $\delta t_{12}$, $\delta t_{13}$, $\delta t_{14}$ and $\delta t_{1N}$ are the time synchronization levels between network nodes. For example: $\delta t_{12}$ may be the time synchronization level between a first network node and a second network node; $\delta t_{13}$ may be the time synchronization level between the first network node and a third network node; $\delta t_{14}$ may be the time synchronization level between the first network node and a fourth network node; and $\delta t_{1N}$ may be the time synchronization level between the first network node and an Nth network node. In some cases, the values $t_{12}$, $\delta t_{13}$, $\delta t_{14}$ and $\delta t_{1N}$ may be the absolute values.

Any suitable function may be used to derive the time synchronization level. For example, the function may be one or more of a maximum, minimum, average, xth percentile, or any other suitable function. For example, in certain embodiments a maximum function may be used. In such a case, the maximum function can be derived as follows according to Equation (2) below:

$$\Delta T = \mathrm{MAX}(\delta t_{12}, \delta t_{13}, \delta t_{14})\tag{2}$$

The adaptation of one or more DRS related parameters may be further based on whether the value of $\Delta T$ is coarse or fine. Whether a value of $\Delta T$ is coarse or fine may be defined in any suitable manner. For example, in some cases the synchronization level (i.e., $\Delta T$) may be considered to be coarse if the time difference between cells (i.e., $\Delta T$) is larger than a threshold (e.g., 0.5 ms or larger). On the other hand, the synchronization level may be considered to be fine if the time difference between cells (i.e., $\Delta T$) is in the order of up to few micro seconds (e.g., 3 µs) or at most below a certain threshold (e.g., 0.5 ms). The various threshold values may be determined in any suitable manner, and may vary according to particular implementations.

As described above, network node 115A may adapt one or more DRS parameters based at least in part on the determined time synchronization level. The one or more DRS parameters may be any suitable DRS parameters. For example, the DRS parameters adapted by network node 115A may include one or more of DRS periodicity, DRS bandwidth, duration of the DRS bursts, and any other suitable parameters. After adapting the one or more DRS parameters based on the synchronization level, network node 115A may transmit the DRS using the adapted parameter(s).

The DRS burst duration is a single parameter for all cells on the same carrier frequency, and may be obtained by UE 110A in any suitable manner (e.g., via signaling or pre-defined rule). Where the value of $\Delta T$ is large (e.g., 2 ms), not all DRS subframes can be received at the UE in case the DRS burst duration is also large (e.g., 5 ms). In certain embodiments, the duration of the DRS burst in time may be adapted based on the determined synchronization level (e.g., based on the value of $\Delta T$). For example, if the synchronization level (i.e., $\Delta T$) is coarse in network 100 (i.e., above a threshold value), then network node 115A may configure a smaller DRS burst duration. But if $\Delta T$ is below a threshold value, then network node 115A may configure a larger value of the DRS burst duration. Thus, in case the time synchronization level is coarse, the actual DRS burst duration ($D_{\mathit{effective}}$) is smaller than the maximum DRS burst duration ($D_{\mathit{MAX}}$). The $D_{\mathit{MAX}}$ is typically 5 subframes.

$D_{\mathit{effective}}$ may be derived in any suitable manner. As a general example, $D_{\mathit{effective}}$ can be derived by network node 115A using Equation (3):

$$D_{\mathit{effective}} = g(D\mathrm{max}, \Delta T)\tag{3}$$

Another example of the general expression to derive $D_{\mathit{effective}}$ is expressed in Equation (4):

$$D_{\mathit{effective}} = g(D\mathrm{max}, \Delta T, \alpha),\tag{4}$$

where $\alpha$ is a scaling factor. The scaling factor $\alpha$ may be a real number used to scale the values of Dmax and/or $\Delta T$. The value of '$\alpha$' is used to account for any implementation margin (e.g., transmission time uncertainty) used for DRS transmission in the network node.

An example of a specific expression to derive $D_{\mathit{effective}}$ is expressed in Equation (5):

$$D_{\mathit{effective}} = \lfloor(D\mathrm{max} - \Delta T)\rfloor\tag{5}$$

Another example of a specific expression to derive $D_{\mathit{effective}}$ is expressed in Equation (6):

$$D_{\mathit{effective}} = \lfloor(D\mathrm{max} - \Delta T - \alpha)\rfloor\tag{6}$$

Assume Dmax=5 ms, $\Delta T$=1 ms and $\alpha$=0.3 ms. The values of $D_{\mathit{effective}}$ according to (5) and (6) are 4 ms and 3 ms, respectively. This means that depending on the synchronization level, network node 115A should configure a maximum number of 4 or 3 DRS subframes within the DRS burst duration. The derived value of $D_{\mathit{effective}}$ may be applicable to cell 120A of network node 115A deriving this value, or it may be applicable to a plurality of cells associated with several network nodes or to all the cells on the same carrier frequency or to more than one carrier frequency. In some cases, the $D_{\mathit{effective}}$ may be applicable per carrier frequency.

Adapting the DRS burst duration may advantageously prevent UE 110A from missing the DRS signal in any of the neighboring cells 120 in network 100, and allow UE 110A to measure within a window of certain length. This is because UE 110A will search and measure DRS signals that are received at UE 110A within the configured DRS burst duration. The configured DRS duration is a single parameter for all cells on the same carrier frequency, and is obtained by UE 110A (e.g., via signaling or pre-defined rule). In case of larger value of $\Delta T$ (e.g., 2 ms), not all DRS subframes can be received at the UE in case the DRS burst duration is also large (e.g. 5 ms). Another main advantage of the adaptive method is that network node 115A may need to configure only DRS subframes, which can be used by UE 110A for performing radio measurements. In other words, the configured DRS subframes are not wasted. This is described in more detail with respect to FIG. 3 below.

Figure 3:
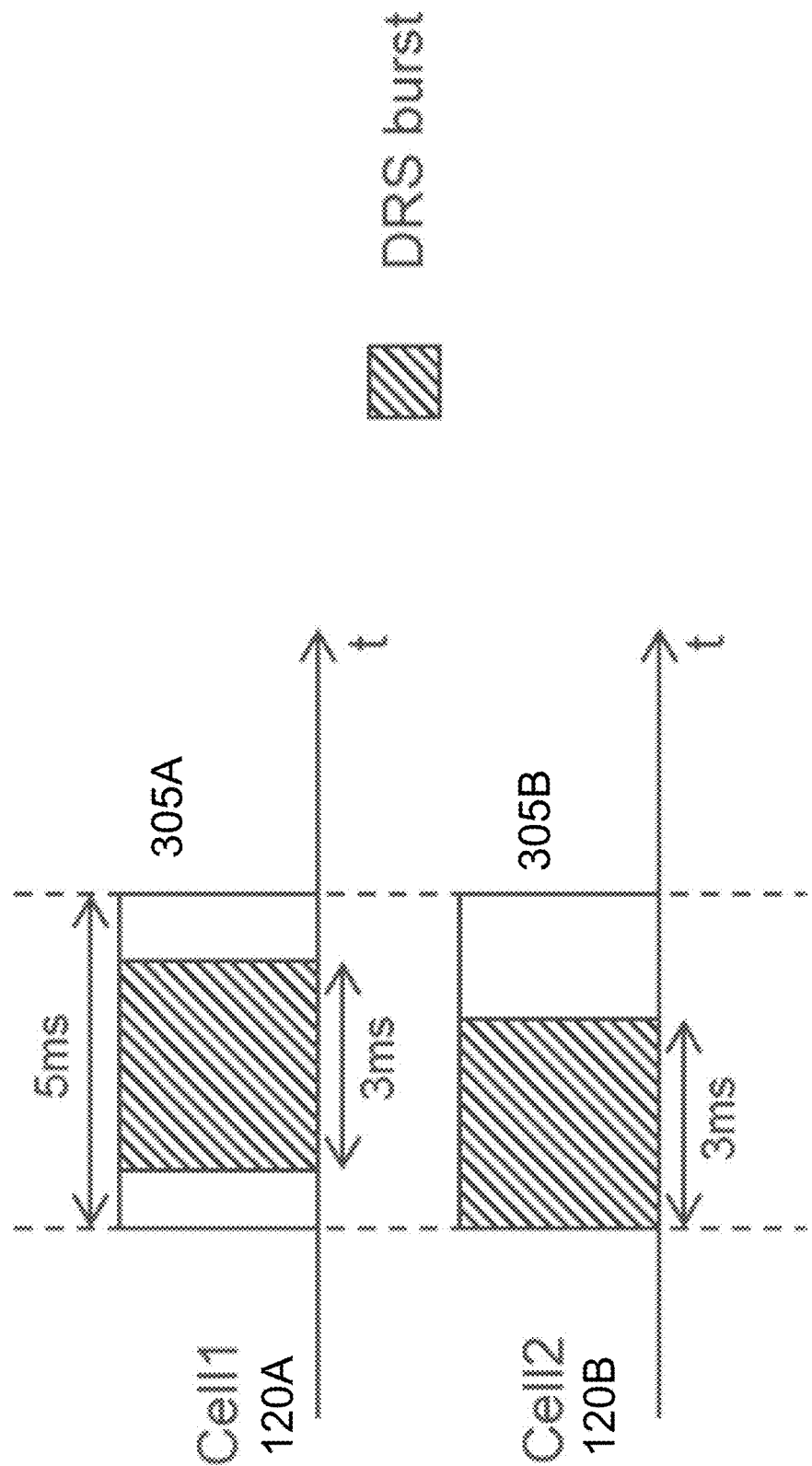
FIG. 3 is a schematic diagram of discovery burst and time misalignment; in accordance with certain embodiments.

FIG. 3 is a schematic diagram of discovery burst and time misalignment that may occur within network 100 of FIG. 2, in accordance with certain embodiments. More particularly, FIG. 3 illustrates DRS bursts 305A and 305B. DRS burst 305A is transmitted within cell 120A, and discovery burst 305B is transmitted within cell 120B. Due to time misalignment in cells 120A and 120B, DRS burst 305A is not synchronized with DRS burst 305B. To address the problem of time misalignment, the duration of the DRS burst may be adapted. For example, assume that the maximum time misalignment between cells 120A and 120B within network 100 is 1 ms ($\Delta T=1$ ms). As described above, the effective duration of the DRS burst may be set to 3 ms (e.g., $D_{\mathit{effective}}=3$ ms) so that the measurements can be done well within 5 ms.

Returning to FIG. 2, in certain embodiments network node 115A may adapt the bandwidth of the DRS based on the determined time synchronization level. The bandwidth of the DRS may be adapted independently or together with one or more other DRS parameters (e.g., DRS burst duration) based on the time synchronization level ($\Delta T$) in the network. For example, in some cases the duration of the DRS burst may be reduced below a threshold value (e.g., to 3 ms or shorter) due to coarse synchronization in the network. In such a case, network node 115A may increase the DRS bandwidth.

The increase in the DRS bandwidth may advantageously enable UE 110A to perform radio measurements over a larger bandwidth, and therefore accumulate more signal and energy during a measurement sample. This in turn improves the quality of the radio measurement, and renders the measurement more reliable for certain uses, such as cell change decisions. In other words, the increase in DRS bandwidth may be able to compensate for the reduction of signals in time due to the shortening of the DRS burst duration. For example, by default network node 115A may configure a DRS bandwidth of 25 RBs (i.e., when the DRS burst duration is of maximum length (i.e., 5 ms). Due to coarse synchronization, however, network node 115A may reduce the DRS burst duration from 5 ms to 3 ms. In such a case, network node 115A may increase the DRS bandwidth from 25 RBs to 50 RBs. Thus, performance of the measurement based on DRS will not be impacted (or the impact will be minimized) due to the level of the synchronization.

In certain embodiments, the DRS burst periodicity may be adapted based on the determined time synchronization level in the network (i.e., value of $\Delta T$). The DRS burst periodicity may be adapted independently or together with one or more other DRS parameters (e.g., DRS burst duration). For example, if the DRS burst duration is shortened due to coarse synchronization level (as described above), network node 115A may configure a shorter value of the DRS burst periodicity. The shorter periodicity of the DRS burst will enable UE 110A to perform radio measurement more often. This, in turn, will compensate for the reduced number of DRS subframes in a shortened DRS burst.

For example, assume that network 100 has initially configured the DRS burst duration and DRS burst periodicity of 5 ms and 80 ms, respectively. Network node 115A may determine that the synchronization level in the network is coarse (e.g., $\Delta T=2$ ms). Based on the determined time synchronization level, network node 115A may shorten the DRS burst duration from 5 ms to 3 ms. In order to compensate for this reduction in the DRS burst duration, network node 115A may decrease the DRS burst periodicity from 80 ms to 40 ms. Decreasing the DRS burst periodicity in such a manner will allow UE 110A to continue performing radio measurement with sufficient accuracy and reliability because the effective number of DRS subframes within a certain time period can be maintained (e.g., 6 DRS subframes over 80 ms).

In certain embodiments, network node 115A may take into account the determined synchronization level for the adaptation of two or more DRS related parameters. Whether to adapt two or more DRS parameters may also depend upon the extent of the synchronization level. For example, assume that due to coarse synchronization of 1 ms the DRS burst duration is reduced to 4 ms. To compensate for this reduction in the DRS burst duration, network node 115A may increase the measurement bandwidth of the DRS from 25 RBs to 50 RBs, but keep the DRS periodicity to 80 ms.

As another example, assume that due to coarse synchronization of 2 ms the DRS burst duration is reduced to 3 ms. To compensate for this reduction in the DRS burst duration, network node 115A may increase the measurement bandwidth of DRS from 25 RBs to 50 RBs. To further compensate, network node 115A may also reduce the DRS burst periodicity from 80 ms to 40 ms. In this way, the overall measurement performance can be retained or even enhanced.

In some cases, network node 115A may communicate information about the adapted one or more DRS parameters to another node (e.g., one or more network nodes 115 and/or UE 110). For example, network node 115A may transmit information about the adapted one or more DRS parameters to network node 115B or network node 115D. In some cases, network node 115A may also transmit this information for a plurality of carrier frequencies (e.g., one set of information for each carrier employing DRS transmission). For example, network node 115A may be performing the adaptation of one or more DRS parameters. Network node 115A may inform one or more neighbor network nodes (such as network nodes 115B, 115C, 115D, etc.) and/or UE 110A that it has adapted one or more DRS parameters. Network node 115A may even further provide detailed information about the adapted values of the one or more DRS parameters to the other network nodes 115 and/or UEs 110. For example, network node 115A may indicate either the new values of the adapted DRS parameters (e.g., DRS burst duration=3 ms) or difference with respect to the last value (e.g., $\Delta$DRS burst duration=1 ms assuming last was 4 ms) or difference with respect to a reference value (e.g., $\Delta$DRS burst duration=2 ms assuming reference value=5 ms or maximum possible value).

The node receiving the information about the adapted one or more DRS parameters may use the information to perform one or more radio operations. For example, the receiving node may use the information about the adapted one or more DRS parameters to adapt its own DRS parameters according to the parameters used in neighboring network nodes. This is because typically the UE 110A assumes the same parameters on all cells on the same carrier frequency. As another example, a UE 110A receiving information about the adapted one or more DRS parameters may use the information to adapt its parameters used for radio measurements on DRS signals. The UE 110A may also use this information to implicitly determine the synchronization level used in network 100 (e.g., shorter DRS burst size means coarse level of synchronization). The determination of the time synchronization level in network node 115A may assist UE 110A in identifying the new cells that transmit DRS on the same carrier frequency.

In certain embodiments, UE 110A may recommend network node 115A adapt one or more DRS related parameter to account for time synchronization level between at least a pair of network nodes. For example, UE 110A may send an indication to network node 115A recommending or requesting network node 115A to adapt one or more DRS related parameters used for transmitting DRS signals on cells on the same carrier frequency or on cells of different carrier frequencies. In some cases, UE 110A may send a request that one or more DRS parameters need to be adapted on certain carrier frequency. In some cases, UE 110A may indicate whether the DRS parameters should be adapted to a denser level or a coarser level with respect to the current values or with respect to reference values. For example, a larger number of DRS subframes (e.g., 4 or 5 subframes) is considered to be a denser DRS parameter value. In another example, shorter DRS burst periodicity (e.g., 40 ms) is also considered to be denser DRS parameter value compared to DRS burst periodicity of 80 ms or 120 ms.

UE 110A may determine whether to send an indication to network node 115A for recommending one or more DRS parameters be adapted based on any suitable criteria. In some cases, UE 110A may determine whether to send an indication to network node 115A based on a determined time synchronization level (e.g., between cells on a carrier). For example, if the time synchronization level is coarse then UE 110A may recommend that network node 115A adapt the one or more DRS parameters (e.g., by recommending network node 115A use a shorter DRS burst duration such as 3 ms). UE 110A can determine the time synchronization level between cells in any suitable manner. For example, UE 110A may determine the time synchronization level between cells based on the received timings of the cells. The received timing of the cell is acquired during cell identification procedure.

In some cases, UE 110A may determine whether to send an indication to network node 115A based on the measurement performance of one or more radio measurements performed by UE 110A on cells with DRS transmission on a carrier. For example, the measurement performance of a radio measurement (e.g., RSRP) may be worse than a threshold value. In such a case, UE 110A may recommend network node 115A adapt the one or more DRS parameters (e.g., recommend using a larger DRS burst duration such as 4 ms or 5 ms). Measurement performance of a radio measurement may include measurement time, measurement period, measurement accuracy, or any other suitable criteria. For example, RSRP accuracy may be expressed as ±2 dB. If the accuracy becomes ±3 dB then it is considered to be worse. In such a case, UE 110A may recommend network node 115A adapt the one or more DRS parameters (e.g., by increasing DRS burst duration and/or periodicity).

The network node receiving the indication from UE 110A, such as network node 115A, may use the information to adapt the one or more DRS parameters. In some cases, network node 115A may take into account a plurality of indications received from a plurality of UEs 110. For example, network node 115A may adapt one or more DRS parameters only if recommended by at least N number of UEs 110 and/or K % of UEs 110 configured to use DRS for performing DRS based measurements. Network node 115A may further take into account its own assessment regarding the need to adapt one or more DRS parameters as described above. For example, network node 115A may adapt one or more DRS parameters only if recommended by a certain number of UEs 110 and also if the need is determined by itself (i.e., by network node 115A).

Although the various embodiments described herein have been described in terms of particular examples, the present disclosure is not limited to the described examples. Moreover, it should be noted that these embodiments are not mutually exclusive. Components from one embodiment may be tacitly assumed to be present in another embodiment and it will be obvious to a person skilled in the art how those components may be used in the other exemplary embodiments. Although the embodiments may be described in terms of single carrier operation of UE 110, the embodiments are applicable for multi-carrier or carrier aggregation operation of UE 110. Therefore the embodiment methods of signaling information to the UE or to the other network node can be carried out independently for each cell on each carrier frequency supported by the network node.

Figure 4:
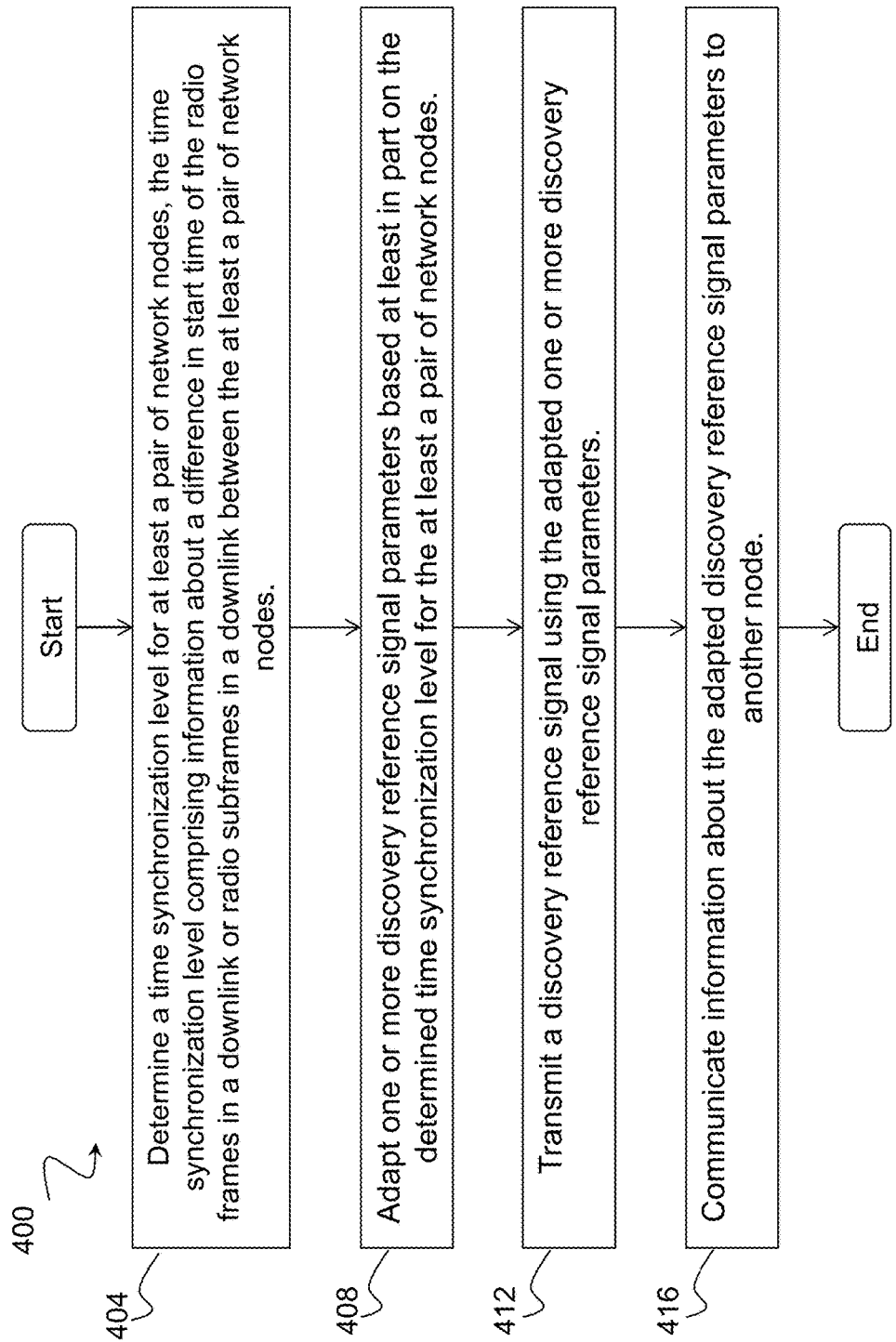
FIG. 4 is a flow chart illustrating a method in a first network node, in accordance with an embodiment.

FIG. 4 is a flow chart illustrating a method 400 in a first network node, in accordance with an embodiment. The method begins at step 404, where the first network node determines a time synchronization level for at least a pair of network nodes, the time synchronization level comprising information about a difference in start time of the radio frames in a downlink or radio subframes in a downlink between the at least a pair of network nodes. In certain embodiments, the first network node may receive, from one or more wireless devices, an indication that the first network node should adapt one or more discovery reference signal parameters. Determining the time synchronization level for the at least a pair of network nodes may comprise one or more of: determining the time synchronization level for the at least a pair of network nodes based at least in part on pre-defined information; receiving information about the time synchronization level for the at least a pair of network nodes; and determining the time synchronization level for the at least a pair of network nodes based at least in part on one or more of historical data or a previously assumed synchronization level. The at least a pair of network nodes may comprise one of: the first network node and a neighboring network node; the first network node and one or more neighboring network nodes within a threshold range of the first network node; and a second network node and a third network node.

At step 408, the first network node adapts one or more discovery reference signal parameters based at least in part on the determined time synchronization level for the at least a pair of network nodes. In certain embodiments, adapting one or more discovery reference signal parameters may be further based at least in part on the indication received from the one or more wireless devices indicating that the first network node should adapt one or more discovery reference signal parameters. Adapting the one or more discovery reference signal parameters may be further based at least in part on whether the determined time synchronization level is larger than a threshold time. The one or more discovery reference signal parameters may be any suitable parameter. For example, in certain embodiments the one or more discovery reference signal parameters comprise one or more of: a discovery reference signal periodicity; a discovery reference signal bandwidth; and a duration of the discovery reference signal burst.

At step 412, the first network node transmits a discovery reference signal using the adapted one or more discovery reference signal parameters. At step 416, the first network node communicates information about the adapted discovery reference signal parameters to another node.

Figure 5:
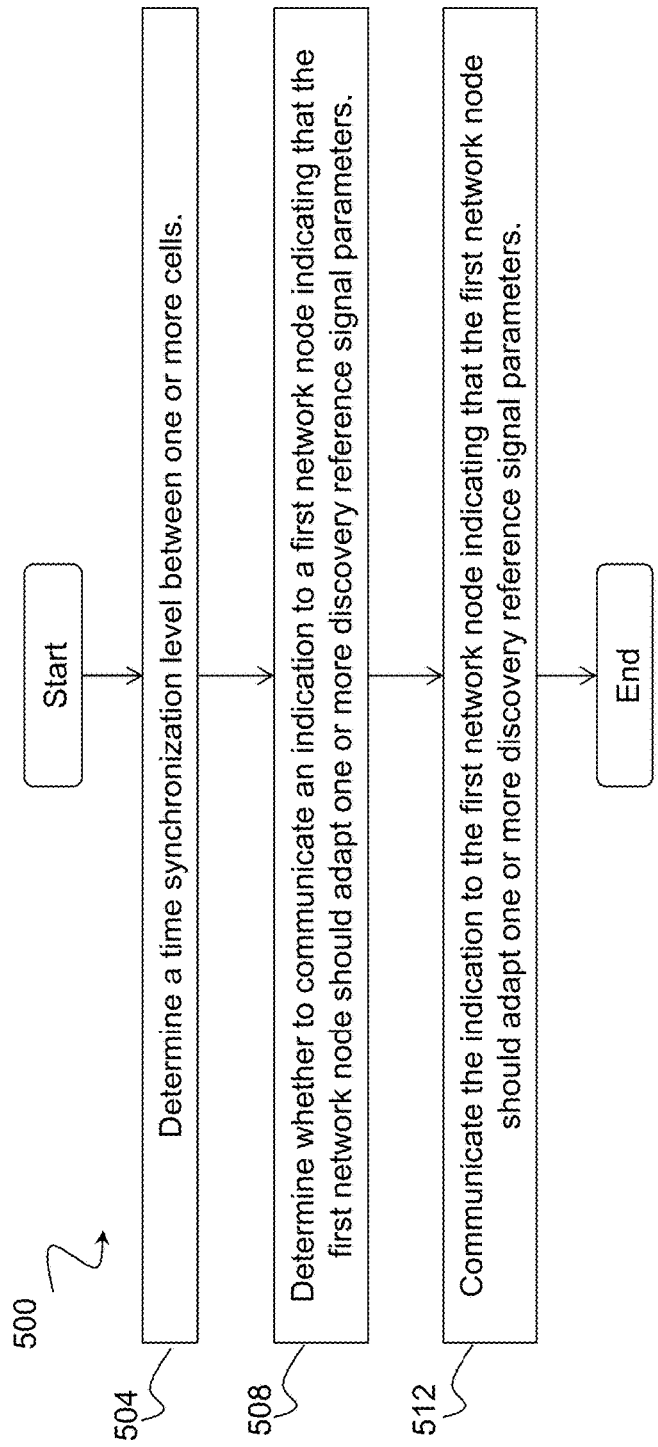
FIG. 5 is a flow chart illustrating a method in a wireless device, in accordance with an embodiment.

FIG. 5 is a flow chart illustrating a method 500 in a wireless device, in accordance with an embodiment. The method begins at step 504, where the wireless device determines a time synchronization level between one or more cells.

At step 508, the wireless device determines whether to communicate an indication to a first network node indicating that the first network node should adapt one or more discovery reference signal parameters. In certain embodiments, determining whether to communicate an indication to a first network node indicating that the first network node should adapt one or more discovery reference signal parameters may be based at least in part on one or more of the determined time synchronization level between the one or more cells; and one or more radio measurements performed by the wireless device on one or more cells with discovery reference signal transmission on the carrier. The one or more discovery reference signal parameters may comprise one or more of: a discovery reference signal periodicity; a discovery reference signal bandwidth; and a duration of the discovery reference signal burst.

At step 512, the wireless device communicates the indication to the first network node indicating that the first network node should adapt one or more discovery reference signal parameters. In certain embodiments, communicating the indication to the first network node indicating that the first network node should adapt one or more discovery reference signal parameters may comprise one or more of sending a request that one or more discovery reference signal parameters be adapted, and indicating that the one or more discovery reference signal parameters should be adapted to one of a denser level or a coarser level with respect to one or more reference values.

In certain embodiments, the method may further comprise receiving information about the adapted discovery reference signal parameters from the first network node. The wireless device may use the received information about the adapted discovery reference signal parameters to perform one or more radio operations. The one or more radio operations may comprise one or more of: adapting one or more parameters used for radio measurements on discovery reference signals; and determining a synchronization level used in the network.

Figure 6:
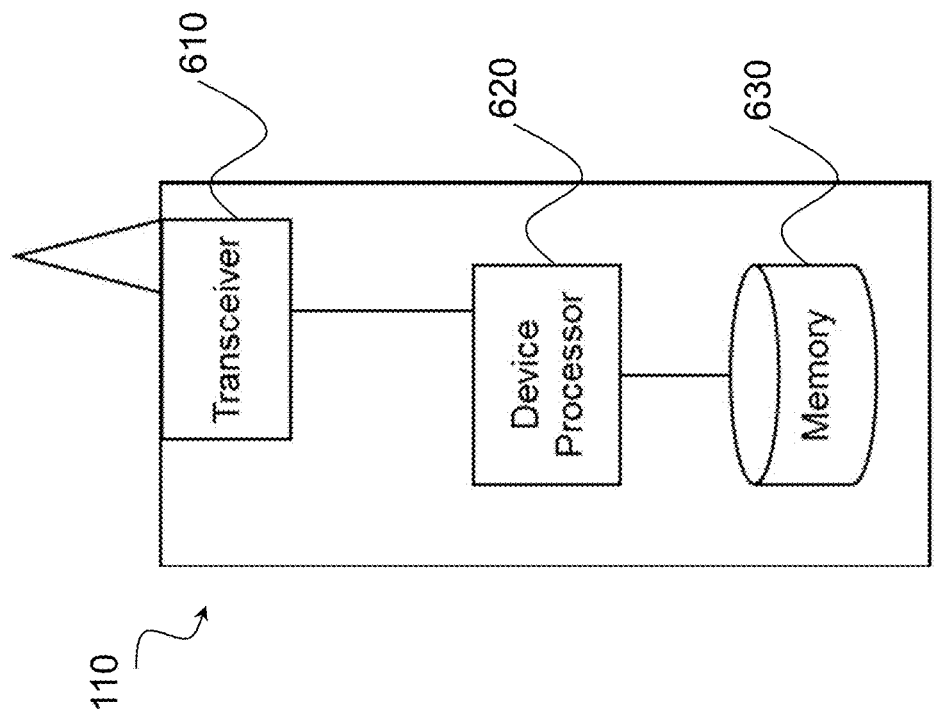
FIG. 6 is a schematic block diagram of an exemplary wireless device, in accordance with certain embodiments.

FIG. 6 is a schematic block diagram of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 610, processor 620, and memory 630. In some embodiments, transceiver 610 facilitates transmitting wireless signals to and receiving wireless signals from network node 115 (e.g., via an antenna), processor 620 executes instructions to provide some or all of the functionality described above as being provided by wireless device 110, and memory 630 stores the instructions executed by processor 620.

Processor 620 may include any suitable combination of hardware and software implemented in one or more modules to execute instructions and manipulate data to perform some or all of the described functions of wireless device 110. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may determine whether to communicate an indication to a first network node indicating that the first network node should adapt one or more DRS parameters. As another example, the determining module may determine a time synchronization level between one or more cells. The determining module may include or be included in processor 620. The determining module may include analog and/or digital circuitry configured to perform any of the functions of the determining module and/or processor 620. The functions of the determining module described above may, in certain embodiments, be performed in one or more distinct modules.

The communication module may perform the transmission functions of wireless device 110. The communication module may transmit messages to one or more of network nodes 115 of network 200. For example, the communication module may communicate the indication to the first network node indicating that the first network node should adapt one or more discovery reference signal parameters. As another example, the communication module may send a request that one or more DRS parameters be adapted. The communication module may include a transmitter and/or a transceiver, such as transceiver 610. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive information about the adapted DRS parameters from the first network node. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 7:
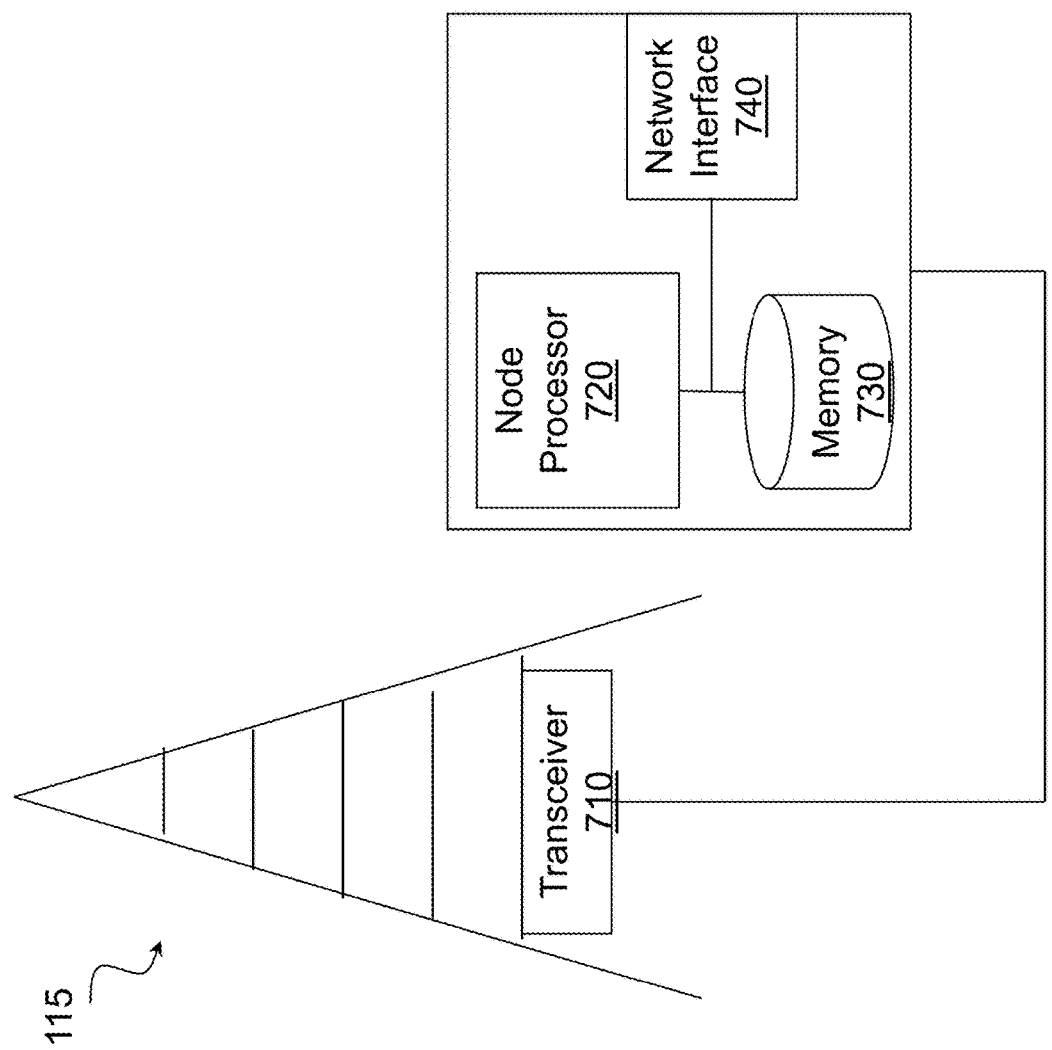
FIG. 7 is a schematic block diagram of an exemplary network node, in accordance with certain embodiments.

FIG. 7 is a schematic block diagram of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 200 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processor 720, memory 730, and network interface 740. In some embodiments, transceiver 710 facilitates transmitting wireless signals to and receiving wireless signals from wireless device 110 (e.g., via an antenna), processor 720 executes instructions to provide some or all of the functionality described above as being provided by a network node 115, memory 730 stores the instructions executed by processor 720, and network interface 740 communicates signals to backend network components, such as a gateway, switch, router, Internet, Public Switched Telephone Network (PSTN), core network nodes 130, radio network controllers 120, etc.

Processor 720 may include any suitable combination of hardware and software implemented in one or more modules to execute instructions and manipulate data to perform some or all of the described functions of network node 115. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 720 of FIG. 7. In certain embodiments, the functions of two or more of the various modules may be combined into a single module.

The determining module may perform the processing functions of network node 115. For example, the determining module may determine a time synchronization level for at least a pair of network nodes. As another example, the determining module may adapt one or more DRS parameters based at least in part on the determined time synchronization level for the at least a pair of network nodes.

The communication module may perform the transmission functions of network node 115. The communication module may transmit messages to one or more of wireless devices 110. For example, the communication module may transmit a DRS using the adapted one or more DRS parameters. As another example, the communication module may communicate information about the adapted DRS parameters to another node. The communication module may include a transmitter and/or a transceiver, such as transceiver 710. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. For example, the receiving module may receive, from one or more wireless devices, an indication that the first network node should adapt one or more discovery reference signal parameters. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
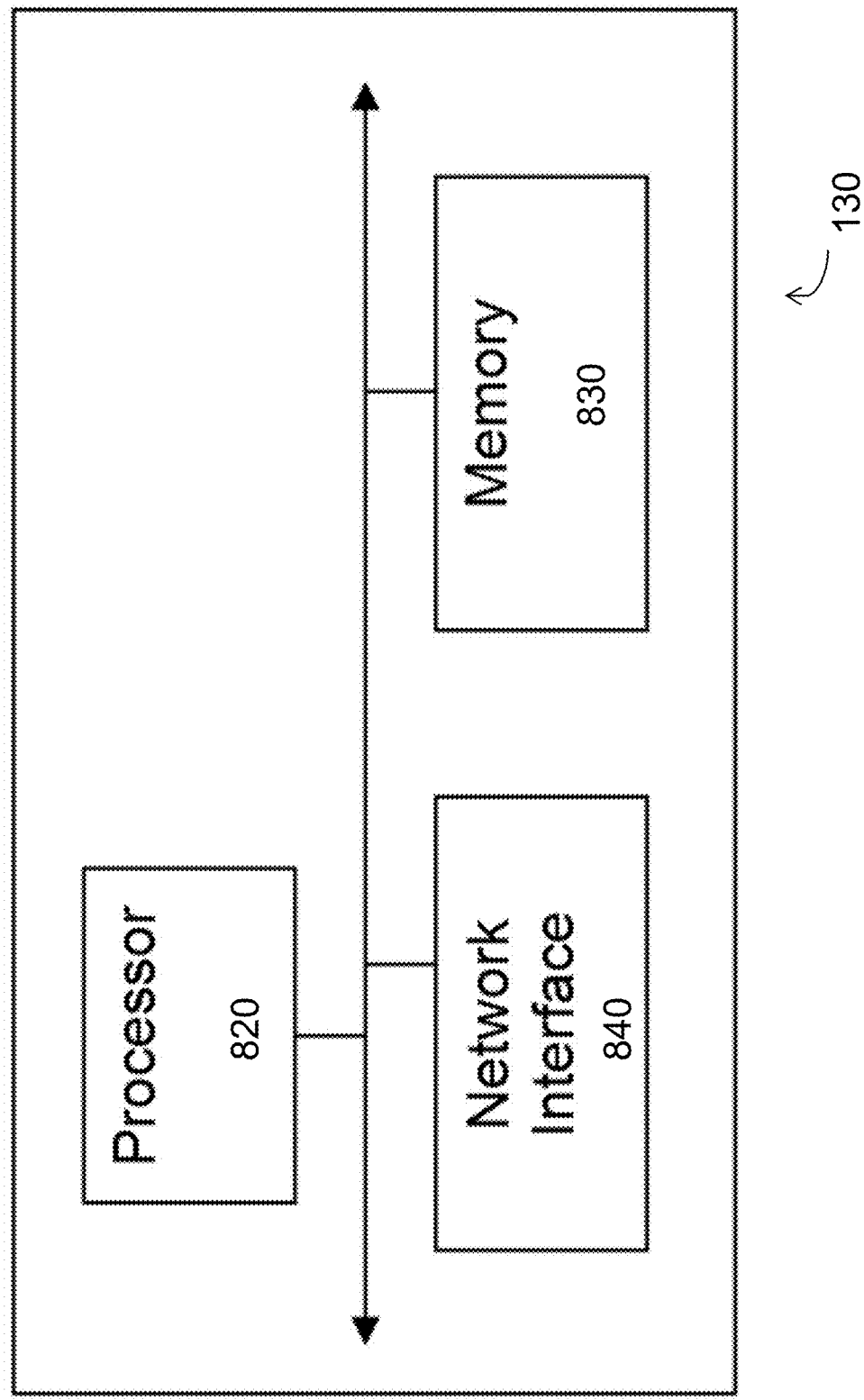
FIG. 8 is a schematic block diagram of an exemplary radio network controller or core network node, in accordance with certain embodiments.

FIG. 8 is a schematic block diagram of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 115, radio network controllers or core network nodes 130, etc.

Processor 820 may include any suitable combination of hardware and software implemented in one or more modules to execute instructions and manipulate data to perform some or all of the described functions of the radio network controller 120 or core network node 130. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BS Base Station
CID Cell Identity
CRS Cell-specific Reference Signal
DL Downlink
ESS Enhanced Synchronization Signal
ID Identity
LTE Long Term Evolution
MDT Minimization of drive test
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRM Radio Resource Management
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator
OTDOA Observed time difference of arrival

The invention claimed is:

1. A method in a first network node, comprising:
receiving, from one or more wireless devices, an indication that the first network node should adapt one or more discovery reference signal parameters;
determining a time synchronization level for at least a pair of network nodes, the time synchronization level comprising information about a difference in start time of radio frames in a downlink or radio subframes in a downlink between the at least a pair of network nodes, wherein the determining comprises one or more of:
determining the time synchronization level for the at least a pair of network nodes based at least in part on pre-defined information;
receiving information about the time synchronization level for the at least a pair of network nodes; and
determining the time synchronization level for the at least a pair of network nodes based at least in part on one or more of historical data or a previously assumed synchronization level;

adapting the one or more discovery reference signal parameters based at least in part on the determined time synchronization level for the at least a pair of network nodes and further based at least in part on whether the determined time synchronization level is larger than a threshold time, responsive to receiving the indication, wherein the one or more discovery reference signal parameters comprise one or more of:
a discovery reference signal periodicity;
a discovery reference signal bandwidth; and
a duration of a discovery reference signal burst; and
transmitting a discovery reference signal using the adapted one or more discovery reference signal parameters.

2. The method of claim 1, further comprising communicating information about the adapted one or more discovery reference signal parameters to another node.

3. The method of claim 1, wherein adapting the one or more discovery reference signal parameters is further based at least in part on the indication received from the one or more wireless devices indicating that the first network node should adapt the one or more discovery reference signal parameters.

4. The method of claim 1, wherein the at least a pair of network nodes comprises one of:
the first network node and a neighboring network node;
the first network node and one or more neighboring network nodes within a threshold range of the first network node; and
a second network node and a third network node.

5. A method in a wireless device, comprising:
determining a time synchronization level between one or more cells, wherein the time synchronization level comprises information about a difference in start time of radio frames in a downlink or radio subframes in a downlink between the one or more cells, wherein determining the time synchronization level between the one or more cells comprises determining the time synchronization level between the one or more cells based on received timings of the one or more cells acquired by the wireless device during a cell identification procedure;
determining whether to communicate an indication to a first network node indicating that the first network node should adapt one or more discovery reference signal parameters based at least in part on the determined time synchronization level between the one or more cells and further based at least in part on whether the determined time synchronization level is larger than a threshold time, wherein the one or more discovery reference signal parameters comprise one or more of:
a discovery reference signal periodicity;
a discovery reference signal bandwidth; and
a duration of a discovery reference signal burst; and
communicating the indication to the first network node indicating that the first network node should adapt the one or more discovery reference signal parameters.

6. The method of claim 5, wherein determining whether to communicate the indication to the first network node indicating that the first network node should adapt the one or more discovery reference signal parameters is based at least in part on one or more of:
the determined time synchronization level between the one or more cells; and
one or more radio measurements performed by the wireless device on the one or more cells with discovery reference signal transmission on a carrier.

7. The method of claim 5, wherein communicating the indication to the first network node indicating that the first network node should adapt the one or more discovery reference signal parameters comprises one or more of:
sending a request that the one or more discovery reference signal parameters be adapted; and
indicating that the one or more discovery reference signal parameters should be adapted to one of a denser level or a coarser level with respect to one or more reference values.

8. The method of claim 5, further comprising receiving information about the adapted one or more discovery reference signal parameters from the first network node.

9. The method of claim 8, further comprising using the received information about the adapted one or more discovery reference signal parameters to perform one or more radio operations, the one or more radio operations comprising one or more of:
adapting one or more parameters used for radio measurements on discovery reference signals; and
determining a synchronization level used in a network.

10. A first network node, comprising:
one or more processors configured to:
receive, from one or more wireless devices, an indication that the first network node should adapt one or more discovery reference signal parameters;
determine a time synchronization level for at least a pair of network nodes, the time synchronization level comprising information about a difference in start time of radio frames in a downlink or radio subframes in a downlink between the at least a pair of network nodes, wherein, in order to determine the time synchronization level for the at least a pair of network nodes, the one or more processors are further configured to perform one or more of:
determine the time synchronization level for the at least a pair of network nodes based at least in part on pre-defined information;
receive information about the time synchronization level for the at least a pair of network nodes; and
determine the time synchronization level for the at least a pair of network nodes based at least in part on one or more of historical data or a previously assumed synchronization level;
adapt the one or more discovery reference signal parameters based at least in part on the determined time synchronization level for the at least a pair of network nodes and further based at least in part on whether the determined time synchronization level is larger than a threshold time, responsive to receiving the indication, wherein the one or more discovery reference signal parameters comprise one or more of:
a discovery reference signal periodicity;
a discovery reference signal bandwidth; and
a duration of a discovery reference signal burst; and
transmit a discovery reference signal using the adapted one or more discovery reference signal parameters.

11. The first network node of claim 10, wherein the one or more processors are further configured to communicate information about the adapted one or more discovery reference signal parameters to another node.

12. The first network node of claim 10, wherein the one or more processors are configured to adapt the one or more discovery reference signal parameters based at least in part on the determined time synchronization level for the at least a pair of network nodes and further based at least in part on the indication received from the one or more wireless devices indicating that the first network node should adapt the one or more discovery reference signal parameters.

13. The first network node of claim 10, wherein the at least a pair of network nodes comprises one of:
   the first network node and a neighboring network node;
   the first network node and one or more neighboring network nodes within a threshold range of the first network node; and
   a second network node and a third network node.

14. A wireless device, comprising:
   one or more processors configured to:
      determine a time synchronization level between one or more cells, wherein the time synchronization level comprises information about a difference in start time of radio frames in a downlink or radio subframes in a downlink between the one or more cells, wherein determining the time synchronization level between the one or more cells comprises determining the time synchronization level between the one or more cells based on received timings of the one or more cells acquired by the wireless device during a cell identification procedure;
      determine whether to communicate an indication to a first network node indicating that the first network node should adapt one or more discovery reference signal parameters based at least in part on the determined time synchronization level between the one or more cells and further based at least in part on whether the determined time synchronization level is larger than a threshold time, wherein the one or more discovery reference signal parameters comprise one or more of:
         a discovery reference signal periodicity;
         a discovery reference signal bandwidth; and
         a duration of a discovery reference signal burst; and
      communicate the indication to the first network node indicating that the first network node should adapt the one or more discovery reference signal parameters.

15. The wireless device of claim 14, wherein the one or more processors configured to determine whether to communicate the indication to the first network node indicating that the first network node should adapt the one or more discovery reference signal parameters comprise one or more processors configured to determine whether to communicate the indication to the first network node indicating that the first network node should adapt the one or more discovery reference signal parameters is based at least in part on one or more radio measurements performed by the wireless device on the one or more cells with discovery reference signal transmission on a carrier.

16. The wireless device of claim 14, wherein the one or more processors configured to communicate the indication to the first network node indicating that the first network node should adapt the one or more discovery reference signal parameters comprise one or more processors configured to perform one or more of:
   send a request that the one or more discovery reference signal parameters be adapted; and
   indicate that the one or more discovery reference signal parameters should be adapted to one of a denser level or a coarser level with respect to one or more reference values.

17. The wireless device of claim 14, wherein the one or more processors are further configured to receive information about the adapted one or more discovery reference signal parameters from the first network node.

18. The wireless device of claim 17, wherein the one or more processors are further configured to use the received information about the adapted one or more discovery reference signal parameters to perform one or more radio operations, the one or more radio operations comprising one or more of:
   adapting one or more parameters used for radio measurements on discovery reference signals; and
   determining a synchronization level used in a network.

* * * * *